(No Model.)
E. TORTORA.
ELECTRIC CONDUCTOR.
No. 425,917.  Patented Apr. 15, 1890.
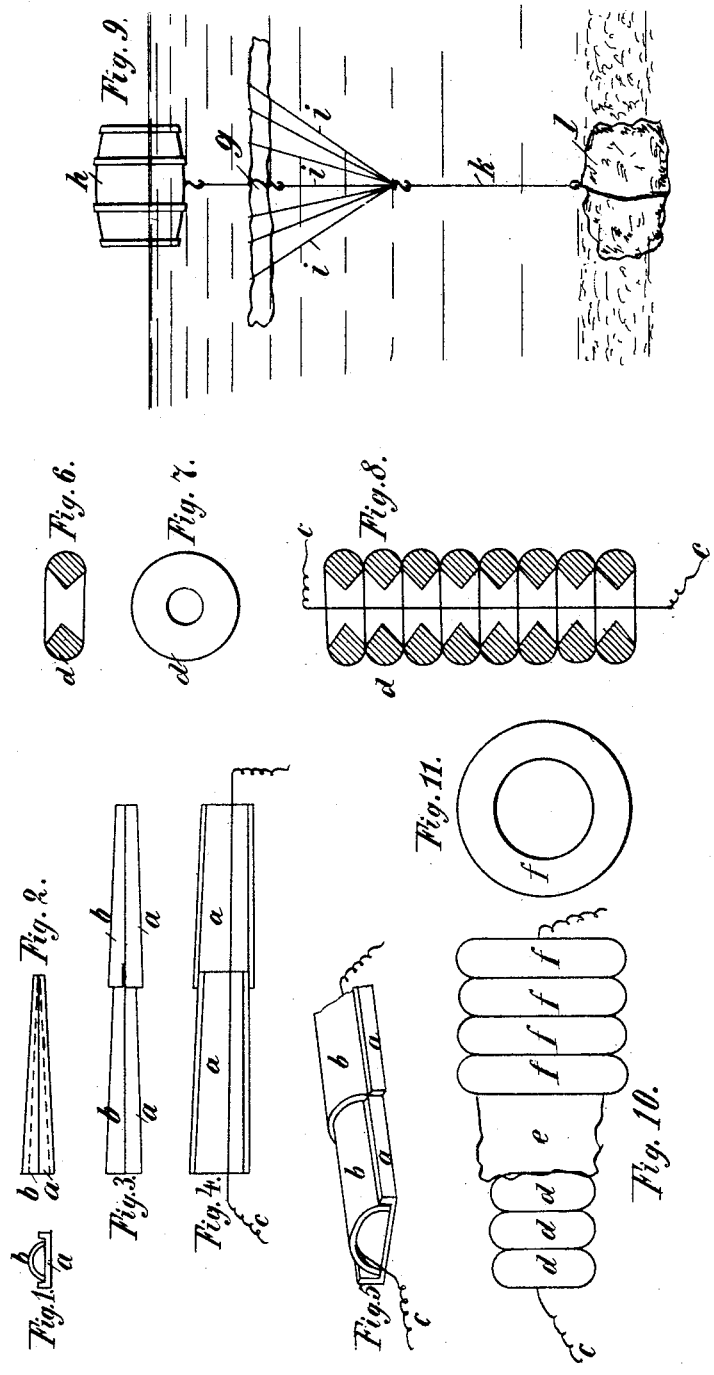
Witnesses:  Inventor:
Eugenio Tortora
By Paine & Ladd,
Att'ys.

UNITED STATES PATENT OFFICE.

EUGENIO TORTORA, OF FLORENCE, ITALY.

ELECTRIC CONDUCTOR.

SPECIFICATION forming part of Letters Patent No. 425,917, dated April 15, 1890.

Application filed April 14, 1887. Serial No. 234,800. (No model.) Patented in Italy December 3, 1886, No. 20,852; in France March 23, 1887, No. 182,391; in Belgium, March 23, 1887, No. 76,828; in England, March 31, 1887, No. 4,809, and in Austria-Hungary September 26, 1888, No. 17,765, and No. 40,246.

*To all whom it may concern:*

Be it known that I, EUGENIO TORTORA, a subject of the King of Italy, and a resident of Florence, in the district of Tuscany, and in the Kingdom of Italy, have invented certain new and useful Improvements in Electrical Conductors, (for which I have received Letters Patent in Italy, No. 20,852, dated December 3, 1886; in France, No. 182,391, dated March 23, 1887; in Belgium, No. 76,828, dated March 23, 1887; in Austria-Hungary, No. 17,765 and No. 40,246, dated September 26, 1888, and in England No. 4,809, dated March 31, 1887;) and I do hereby declare that the following is a full, clear, and exact description thereof.

My invention pertains to certain new and useful improvements in tubes for inclosing electrical conductors; and it comprises a series of glass boxes hermetically sealed or connected together for retaining therein dry atmospheric air which surrounds the inclosed wire, substantially as hereinafter fully set forth, and particularly pointed out in the claim.

The air to be applied to the interior of such glass boxes or tubes is preferably thoroughly dried by passing the same through sulphuric acid, or by passing it through refrigerated tubes, where it precipitates its water on the sides instead of carrying it into the interior of the cool glass tubes or by similar heating.

In the accompanying drawings, Figure 1 is a cross-section of a glass box forming part of underground insulating-canals. Fig. 2 is a side elevation of the same. Fig. 3 is a side view of two glass boxes joined together. Fig. 4 is a top view of Fig. 3, with removed glass cover, to show the inclosed conducting-wire. Fig. 5 is a perspective view of the joined glass boxes with the conducting-wire. Fig. 6 is a cross-section of a glass ring employed for submarine cables; Fig. 7, a top view of the same; Fig. 8, a cross-section of a flexible cable. Fig. 9 illustrates the manner of sustaining the submarine cable. Fig. 10 is an elevation of a double-ringed cable, and Fig. 11 is a side view of one of the double glass rings.

Similar letters refer to similar parts throughout the several views.

$a$ is the glass box, of wedge-shaped or inclined side base.

$b$ is the cover, and $c$ the conducting-wire.

The different pieces $a$ are connected to each other by placing the narrow end of the one into the wider end of the adjacent one, thus producing an uninterrupted glass channel. The wire $c$ is then put correctly in place and the channel covered by the semi-conical pieces $b$, of a form corresponding with the boxes $a$, and the wide end of the one piece covering the narrow end of the next one. The joints of the pieces $a$ and $b$ are made tight by some suitable material, as asphaltum, bitumen, or other cement. The air contained within such glass tubes is dried, as before mentioned, and the ends hermetically closed by some insulating material.

Figs. 6 to 11 show a convenient method of producing flexible cables particularly adapted for submarine uses according to my invention. The cable is formed by a number of glass rings $d$, arranged side by side and connected by an outer rubber hose $e$, Fig. 10, for protection against the attacks of fishes, insects, &c. I make use in some cases of a second series of glass rings $f$, which are striped or layered over the rubber. The conducting-wire passes through all the rings $d$, which interiorly are of angular form, as shown in Fig. 5, so as to offer a minimum of contact-surface to the wire. The wire is surrounded, as before said, by dry air, and the ends of the cable outside of the water hermetically closed, as above mentioned. As the water has a certain depth, a determined density, which can be calculated by the height of hydraulic column, this cable can be made of a corresponding specific weight and suspended in any convenient depth by means of loops $g$, attached to a number of buoys $h$, and by means of ropes $k$, provided with suitable branches $i\ i$, to weights $l$, preferably a stone of unalterable composition, the cable thus floating in a depth beyond that of liability to be struck by the hull of ships, by icebergs, and beyond the range of oceanic currents, and its direction being indicated by the buoys, it can be lifted when desired, or when necessary for repairing or for other purposes. The buoys will also serve to indicate where marine telegraphic stations may be located.

Having thus particularly described and ascertained the nature of my said invention and in what manner it is to be performed, what I claim is—

The herein-described improvement in tubes for inclosing electrical conductors, comprising a series of glass boxes of wedge-shaped or inclined side bases hermetically sealed or connected together, substantially as set forth, the narrow end of one box being inserted in the widened end of the adjacent box, as stated.

In testimony that I claim the foregoing I have hereunto set my hand this 14th day of March, 1887.

EUGENIO TORTORA. [L. S.]

Witnesses:
A. B. MANNUCCI,
SPIRITO BERNARDI.